UNITED STATES PATENT OFFICE.

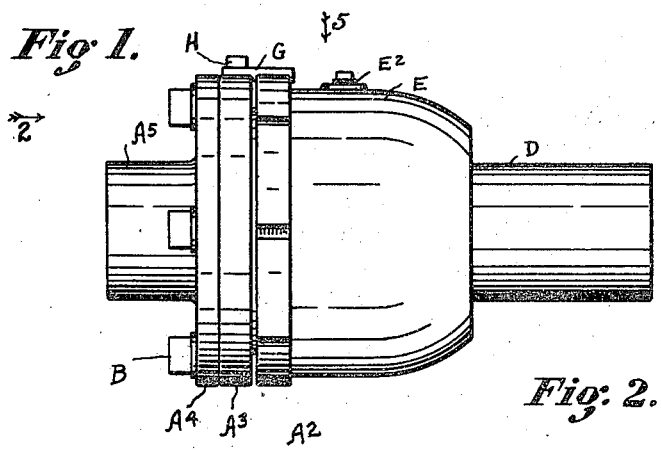
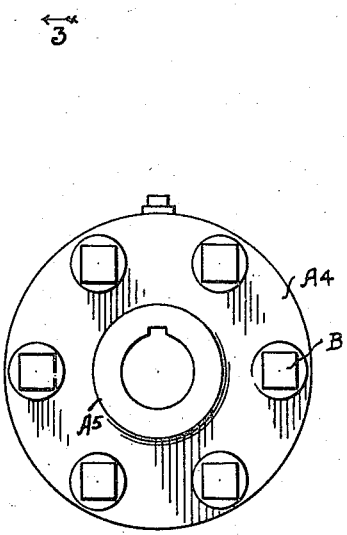
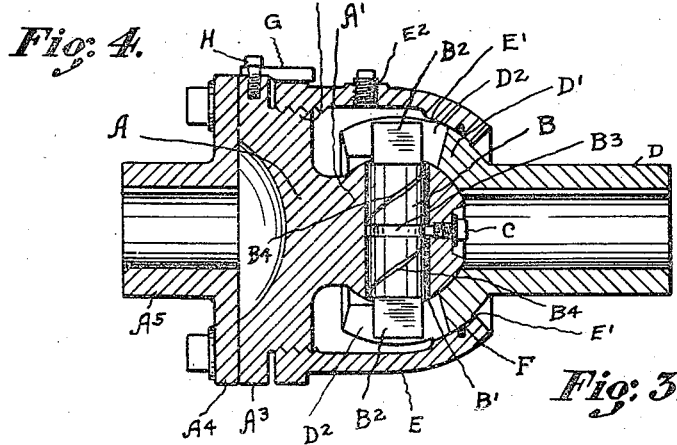
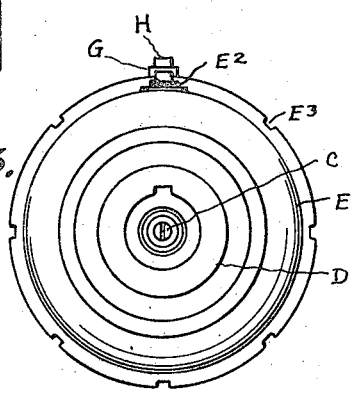
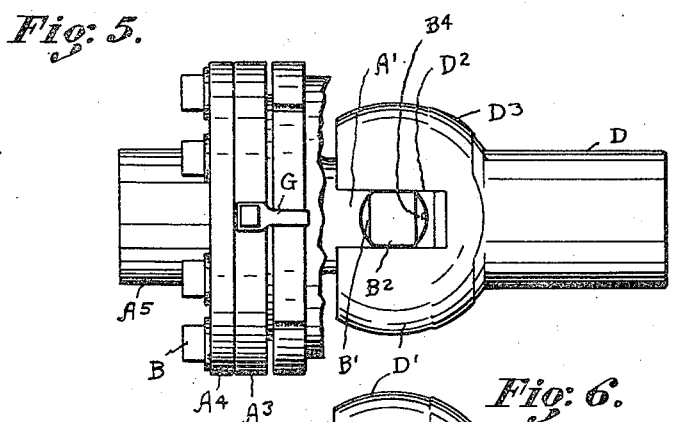
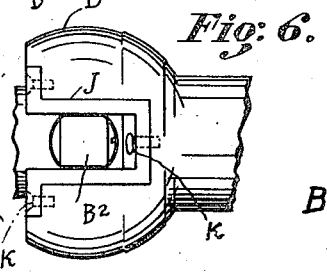

CLARENCE G. WOOD, OF MUNCIE, INDIANA.

UNIVERSAL JOINT.

1,237,135.	Specification of Letters Patent.	Patented Aug. 14, 1917.

Application filed December 1, 1916. Serial No. 134,218.

*To all whom it may concern:*

Be it known that I, CLARENCE G. WOOD, a citizen of the United States, residing at Muncie, in the county of Delaware and State of Indiana, have invented certain new and useful Improvements in Universal Joints, of which the following is a specification.

This invention relates to improvements in universal joints.

The objects of my invention are to improve the construction of and to provide a universal joint which will be strong and durable, simple in construction, and economical of manufacture.

The purposes of my invention are accomplished by and the invention is embodied in the new construction, combination and arrangement of parts described in this specification, defined in the appended claims, and illustrated in the accompanying drawings.

The several parts of the invention are identified by suitable characters of reference applied thereto in the different views in the drawings, in which—

Figure 1 is a side view of my improved universal joint.

Fig. 2 is an end view taken in the direction indicated by the arrow 2 in Fig. 1.

Fig. 3 is an end view taken in the direction indicated by the arrow 3 in Fig. 1.

Fig. 4 is a central longitudinal sectional view.

Fig. 5 is a view taken in the direction indicated by the arrow 5 in Fig. 1, a portion of the connecting sleeve being broken away; and Fig. 6 is a modification showing a boxing bearing for the head of the wrist pin.

This invention contemplates the construction of a universal joint of compact construction and a minimum number of parts. A joint constructed in accordance with my invention comprises two head members articulated universally, a power transmitting connection between the head members, and a connecting member to retain the head members in co-engagement.

For the purposes of clearly describing this invention, the head members are designated as the drive member and the driven member and the same are identified by structural form which distinguish them specifically. However it will be understood that the descriptive titles could be reversed, for the reason that the joint is efficient whichever head member of same may be connected to the driving shaft.

The preferred form of embodiment of my invention is that shown in the accompanying drawings. The ring shaped drive member A made of suitable metal such as steel, has the spherical head $A^1$ and a threaded shoulder $A^2$. The base portion of this driving member is of divided formation the flanges $A^3$ and $A^4$ being united by bolts B and the shank $A^5$ being of suitable diameter and length and having the usual bore and key seat for the reception and securing of the driving shaft (not shown). In a suitable transverse bore through the spherical head $A^1$ is journaled a power transmitting member designated as a wrist pin B. This wrist pin is of one-piece construction; the cylindrical body is of such length that the shoulder ends $B^1$ register just inside of the face of the head $A^1$. The heads $B^2$ are square in cross section and are of machined dimensions to fit slidingly in the recesses $D^2$ of the spherically bored head $D^1$ to be presently referred to.

Engagement of the central circumferential groove $B^3$ by the end of the stud screw C prevents transverse shifting of the wrist pin B but at the same time the wrist pin is free to move rotatively. $B^4$ and $B^4$ designate lubricant grooves or channels which extend from the shoulders $B^1$ to the groove $B^3$. By this construction and arrangement of parts as shown the necessary machine work is reduced to a minimum. With the machining of the face of the flange $A^3$ and the transverse boring through the head $D^1$, the drive member is in readiness to receive the wrist pin. The wrist pin while being retained against transverse displacement is free to assume correct coöperative position at all times, and is operable without noise or vibration, and with a minimum of friction. It is apparent also that this wrist pin is capable of long time wear for the reason that when desired, it may be turned a quarter of a revolution to present new faces of the heads $B^2$ to the bearing surfaces of the recesses in the head $D^1$ of the driven member. The driven member D which also is made of steel has the spherical head $D^1$ of socket formation. That is to say, this spherical head has a bore of machined dimensions to fit slidingly the head $A^1$, the frontal portion being open to permit of its being easily placed in engagement with the head $A^1$. In the sides of this head $D^1$ are machined recesses $D^2$ of width to permit of the free bearing of the heads B² of the wrist pin. The length of each recess is sufficient to afford clearance of the wrist pin heads at any angle of shaft alinement. The only further machine work necessary on the head D¹ is a circumferential face or seat D⁶ whose function will be presently described.

To join the said drive member and the driven member D, and to retain them in the coöperative position shown, there is provided a connecting member or element designated as a sleeve. This sleeve E which may be made of such suitable metal as steel, or bronze or malleable iron has its base end threaded internally to be screwed on the shoulder A² of the drive member. The head end has its internal face E¹ machined to fit the face D³ of the head D¹. An additional function performed by the sleeve E is the retention of a supply of lubricant which is introduced through the stoppered hole E². Escape of the lubricant is prevented by a ring of felt F inset in a suitable internal annular groove in the sleeve and which closes the joint between the face E¹ of the sleeve and the seat D³ of the head D¹. In the flange of the sleeve E are spaced notches E³. When the sleeve has been moved to correct position, the lock clip G carried by the drive member is set into a notch and secured by the set screw H. By this arrangement such adjustment as may be necessary between the sleeve and the head D¹ is easily available.

From this description and illustration it is seen that this joint consists of extremely few parts, and same are stocky, rugged, and closely connected. Comparatively little amount of machine work is necessary, and by reason of the connecting sleeve performing the double function of a connecting means, and as a retainer for lubricant, the liability of derangement or noise is avoided.

If for any reason it may be deemed desirable to use boxings for bearing surfaces for the heads of the wrist pin, the form of the recesses in the head D¹ may be changed and boxings of suitable metal may be secured therein. In Fig. 6 is shown a view wherein J designates a boxing fitted in the suitable recess provided therefor, and secured by countersunk screws K.

Although the several parts of my invention are made up in the preferred form and construction, I am aware that minor changes may be made within the scope of the invention as defined by the claims, without departing from the nature or spirit of the invention.

What I claim as my invention, and desire to secure by Letters Patent, is—

1. A universal joint comprising a drive member, a driven member articulated therewith for universal movement, a loosely disposed connector between the said members, a connecting sleeve adjustably connected to one of the members, and a device to hold the said sleeve at different adjusted positions.

2. A universal joint comprising a rotatable member having a spherical head with a transverse bore, a second rotatable member having a spherical head with socket opening to fit the head of the first named member and there being longitudinal recesses in the head of said second member, and a connector retained rotatively in said transverse bore provided with head ends to occupy slidingly the said recesses, a sleeve having its base adapted to be secured to the first named rotatable member and its open end adapted to engage the head of the second member and a device to hold the said sleeve at different adjusted positions, substantially as described.

3. A universal joint comprising a rotatable member having a spherical head with a transverse bore, a second rotatable member having a spherical head with socket opening to fit the head of the first named member and there being longitudinal recesses in the head of said second member, a connector retained rotatively in said transverse bore provided with head ends to occupy slidingly the said recesses, a sleeve having its base adapted to be secured to the first named rotatable member and its open end adapted to engage the head of the second member, there being an annular internal recess near the edge of its open end, a felt packing ring in said recess, and a device to hold the said sleeve at different adjusted positions.

4. In a universal joint of the kind described, a spherical head with a transverse bore, a second rotatable member having a spherical head with a socket opening to fit the head of the first named member, a connector adapted to be retained rotatively in the transverse bore of the internal spherical head and its head ends to engage slidingly the longitudinal recesses of the external spherical head, there being a central peripheral groove in the said connector, and a set stud carried by the said internal spherical head to loosely engage said groove.

In testimony whereof I affix my signature in the presence of two witnesses.

CLARENCE G. WOOD.

Witnesses:
 ARTHUR E. VINTON,
 THOMAS L. RYAN.